(12) United States Patent
Naaman et al.

(10) Patent No.: US 10,519,554 B2
(45) Date of Patent: Dec. 31, 2019

(54) WATER SPLITTING METHOD AND SYSTEM

(71) Applicant: YEDA RESEARCH AND DEVELOPMENT CO. LTD., Rehovot (IL)

(72) Inventors: Ron Naaman, Yarkona (IL); Claudio Fontanesi, Rehovot (IL); Wilbert Mtangi, Rehovot (IL)

( * ) Notice: Subject to any disclaimer, the term of this patent is extended or adjusted under 35 U.S.C. 154(b) by 206 days.

(21) Appl. No.: 15/517,738

(22) PCT Filed: Oct. 7, 2015

(86) PCT No.: PCT/IL2015/051004
§ 371 (c)(1),
(2) Date: Apr. 7, 2017

(87) PCT Pub. No.: WO2016/056011
PCT Pub. Date: Apr. 14, 2016

(65) Prior Publication Data
US 2018/0030601 A1    Feb. 1, 2018

Related U.S. Application Data

(60) Provisional application No. 62/060,590, filed on Oct. 7, 2014.

(51) Int. Cl.
*C25B 1/00* (2006.01)
*C25B 1/04* (2006.01)
(Continued)

(52) U.S. Cl.
CPC ............ *C25B 1/003* (2013.01); *C25B 1/04* (2013.01); *C25B 11/0405* (2013.01);
(Continued)

(58) Field of Classification Search
CPC .................................................. C25B 1/003
See application file for complete search history.

(56) References Cited

U.S. PATENT DOCUMENTS 5,944,966 A * 8/1999 Suetsugu ............ C25B 11/0489
204/290.11
8,338,323 B2 12/2012 Takasu et al.
(Continued)

FOREIGN PATENT DOCUMENTS

CN    102421942 A    4/2012
EP    2730681 A1    5/2014
(Continued)

OTHER PUBLICATIONS

Tris(bipyridine)ruthenium(II) chloride from Wikipedia, accessed at http://en.wikipedia/org/wiki/Tris(bipyridine)ruthenium(II)_chloride on Mar. 20, 2019 (Year: 2019).*
(Continued)

*Primary Examiner* — Harry D Wilkins, III
(74) *Attorney, Agent, or Firm* — Browdy and Neimark, P.L.L.C.

(57) ABSTRACT

An electrode is presented for use in an oxidation process. The electrode comprises a substrate having an electrically conductive surface carrying a chiral system. The chiral system is configured for controlling spin of electrons transferred between the substrate and electrolyte during the oxidation process.

18 Claims, 14 Drawing Sheets

(51) Int. Cl.
*C25B 11/04* (2006.01)
*H01G 9/20* (2006.01)

(52) U.S. Cl.
CPC ....... *C25B 11/0442* (2013.01); *H01G 9/2031* (2013.01); *H01G 9/2054* (2013.01); *Y02E 60/366* (2013.01)

(56) References Cited

U.S. PATENT DOCUMENTS

2012/0080310 A1    4/2012  Nomura et al.
2015/0298100 A1*  10/2015  Hill .................... B01J 23/75
                                                205/632

FOREIGN PATENT DOCUMENTS

JP       11-12776 A       5/1989
WO    2013/148996 A1    10/2013

OTHER PUBLICATIONS

Carmeli et al., Spin Selectivity in Electron Transfer in Photosystem I, Angew. Chem. Int. Ed., 53:8953-8958 (2014).

Chretien et al., O2 evolution on a clean partially reduced rutile TiO2,,110 . . . surface and on the same surface precovered with Au1 and Au2: The importance of spin conservation, The Journal of Chemical Physics, 129:074705-074705-16 (2008).

Gray, Powering the planet with solar fuel, Nature Chemistry, 1:7 (2009).

Mtangi et al., Role of the Electron Spin Polarization in Water Splitting, The Journal of Physical Chemistry Letters, 6:4916-4922 (2015).

Naaman et al., Chiral-Induced Spin Selectivity Effect, he Journal of Physical Chemistry Letters, 3:2178-2187 (2012).

Nogues et al., Electrical properties of short DNA oligomers characterized by conducting atomic force microscopy, Phys. Chem. Chem. Phys., 6:4459-4466 (2004).

Torun et al., Role of Magnetism in Catalysis: RuO2 (110) Surface, J. Phys. Chem., 117:6353-6357 (2013).

Wei et al., Molecular Chirality and Charge Transfer through Self-Assembled Scaffold Monolayers, J. Phys. Chem., 110 (3):1301-1308 (2006).

Xie et al., Spin Specific Electron Conduction through DNA Oligomers, Nano Lett., 11:4652-4655 (2011).

Mayer et al., Hematite/Si Nanowire Dual-Absorber System for Photoelectrochemical Water Splitting at Low Applied Potentials, Journal of the American Chemical Society, 134:12406-12409 (2012).

* cited by examiner

| | | |
|---|---|---|
| Al5 and Al7 | -(COOH)-(Ala-Aib)₅ or ₇-NH-(CH₂)₂-SH | |
| MUA | SH-(CH₂)₁₀-COOH | |
| MPA | SH-(CH₂)₂-COOH | |
| 4-MBA | p,SH-(C₆H₄)-COOH | |
| 3-MBA | m,SH-(C₆H₄)-COOH | |

Figure 12

WATER SPLITTING METHOD AND SYSTEM

TECHNOLOGICAL FIELD

The present invention is generally in the field of water splitting techniques hydrogen production techniques utilizing multiple electrons reactions, oxidation of water and reduction of oxides (like $CO_2$), and is particularly useful for hydrogen production.

BACKGROUND ART

References considered to be relevant as background to the presently disclosed subject matter are listed below:
1. Gray, H. B. *Nat. Chem.* 2009, 1, 7.
2. Chretien, S.; Metiu, H. *J. Chem. Phys.* 2008, 129, 074705.
3. Torun, E.; Fang, C. M.; de Wijs, G. A.; de Groot, R. A. *J. Phys. Chem. C.* 2013, 117, 6353.
4. Naaman, R.; Waldeck, D. H. *J. Phys Chem. Lett.* 2012, 3, 2178.
5. Mayer, M. T.; Du, C.; Wang, D. *J. Am. Chem. Soc.* 2012, 134, 12406.
6. Nogues, C.; Cohen, S. R.; Daube, S. S.; Naaman, R. *Phys. Chem. Chem. Phys.* 2004, 6, 4459.
7. Xie, Z.; Markus, T. Z.; Cohen, S. R.; Vager, Z.; Gutierrez, R.; Naaman, R. *Nano Lett.* 2011, 11, 4652.

Acknowledgement of the above references herein is not to be inferred as meaning that these are in any way relevant to the patentability of the presently disclosed subject matter.

BACKGROUND

Key biochemical reactions in nature, like photosynthesis and respiration, are multiple electron reactions. In nature, these reactions are highly efficient. Water splitting is an example of such reaction of the decomposition of water ($H_2O$) into oxygen ($O_2$) and hydrogen gas ($H_2$). This reaction involves the transfer of four electrons and the formation of an oxygen-oxygen bond concomitant with reduction of protons to produce hydrogen.

In electrochemical cell, the thermodynamics threshold for the above process actually requires the application of electric potential of 1.23 V (versus Ag/AgCl electrode). However, typically higher potential is needed, this is the over-potential. Efforts have been made to try to reduce the over-potential needed to drive the reaction by using specialized catalysts.

Water splitting cells may be used in dark. They may also operate using light so as to reduce the amount of electric potential needed. The conversion of solar energy to hydrogen by means of water splitting process is one of the most interesting ways to achieve clean and renewable energy systems. However, currently because of the over potential and the cost of the catalysts, production of hydrogen from water is expensive and is uncompetitive with production from coal or natural gas. Efficient and economical water splitting would be a key technology component of a hydrogen economy. The principle of photoelectrochemical water decomposition is based on the conversion of light energy into electricity within a cell involving two electrodes, immersed in an aqueous electrolyte, of which at least one is made of a semiconductor exposed to light and able to absorb the light. This electricity is then used for water electrolysis.

Several processes occur within the photo-electrochemical cell:

i) Light-induced excitation of the semiconductor electrode, resulting in the formation of quasi-free electrons and electron holes.

ii) Oxidation of water at the photo-anode by holes. This process involves the transfer of four electrons, for forming a single oxygen molecule.

iii) Transport of $H^+$ ions from the photo-anode to the cathode through the electrolyte and transport of electrons from photo-anode to the cathode through the external circuit;

iv) Reduction of hydrogen ions at the cathode by electrons.

For the decomposition of water into molecular hydrogen (and oxygen that occurs as the by-product) photoelectrochemical cells (PEC-photoelectrochemical cell) were developed in the state of the art. Such a cell has been described for example in US patent application 2008/0131762.

The photoelectrochemical cells usually consist of a photo anode, a semiconducting material which is subjected to solar radiation for generating electron-hole pairs, and at least one counter electrode forming a cathode. The electrodes are immersed into an electrolytic solution. A current-conducting connection between the electrodes is further provided for closing the circuit. The current generated by solar energy on the photo anode will flow to the opposite cathode in order to react with the H+ ions into molecular hydrogen. This technology is based on the internal photo effect, wherein the short-wave radiation components which can excite electron-hole pairs in the semiconductor are converted into molecular hydrogen and therefore into chemical energy.

Either in the photo-electrochemical process or in the dark electrochemical process, the practical production of hydrogen from water is hampered by the need to apply additional voltage to initiate the reaction, beyond the electrochemical value. This over-potential results in low efficiency and lack of selectivity in the oxidation process, since other molecules besides water tend to be oxidized. Hence, although hydrogen is considered to be an ultimate fuel, its efficient production remains a challenge.

GENERAL DESCRIPTION

There is a need in the art for improving the water splitting based hydrogen production, eliminating a need for over-potential application.

Over-potential is an electrochemical term which refers to the potential difference between a half-reaction's thermodynamically determined reduction potential and the potential at which the reaction is experimentally observed, and thus describes the cell voltage efficiency.

The conventional approach for water splitting in an electrochemical cell, suffers from a need to apply such over-potential to initiate the reaction, thus resulting in low efficiency of the process. Theoretical studies have suggested that the over-potential required to split water into hydrogen and oxygen stems from electrons' spin restrictions in forming the ground state triplet oxygen molecule [2]. When non-magnetic electrodes are used, the reaction has high probability to occur on a singlet potential surface, which leads to the excited oxygen molecule, and hence, a barrier exists in the reaction process. It has been proposed that magnetic electrodes, in which the electrons spins are co-aligned, might overcome this problem [3]. However, magnetic electrodes introduce new challenges, both economically and technologically.

The invention relates inter alia to a novel approach for water splitting and therefore for hydrogen production. The novel approach of the present invention is based on the control of the spin alignment of electrons in order to affect the energetic condition of splitting the water molecules.

In some embodiments, this is implemented by providing an electrode carrying a chiral system. The electrode which may be used in an oxidation process, comprises a substrate having an electrically conductive surface carrying a chiral system, wherein the chiral system is configured for controlling the spin of electrons transferred between the substrate and electrolyte. The chiral system is a medium possessing chiral properties, which may be formed by organic and/or inorganic chiral matter. Therefore, the chiral system may comprise at least one of organic and inorganic matter having chiral properties. Such chiral system may include chiral molecules or chiral polymer, and may be configured as a single- or multi-layer structure. The chiral system may be formed by depositing a layer/film of chiral material (e.g. coating/adsorbing) on an electrode. The chiral system may be chemically bound to the electrode's surface or physically adsorbed on the surface, e.g. may include a self-assembled monolayer of the chiral molecules. The chiral system may include for example one or more of the following: oligopeptides, amino acids, DNA, helicenes, and chiral conductive polymer.

In the description below, the chiral system is referred to as "chiral molecules". However, as described above, this term should be interpreted broadly covering media having chiral properties. It should also be noted that, although in the description below the electrode of the present invention is described as a substrate having electrically conductive surface carrying chiral system, the term "carrying" should be interpreted broadly referring to any known suitable type of surface modification to provide chiral properties to said electrically conductive surface.

It should be understood that as described above, the origin of the large over-potential and the non-specificity of the conventional systems is the requirement that the two oxygen atoms will be in close proximity, so that exchange interaction will induce the spin alignment. By having spin alignment controlled by the electrode carrying chiral material, the need for such proximity is eliminated and reaction takes place at larger cross-section. Therefore, high over-potential is not required and higher selectivity is obtained. The chiral-controlled effect brings the artificial water oxidation system closer to the natural one.

The inventors have tested three different cell configurations for hydrogen production. In all the chiral effect was verified. In the case of chiral molecule, the efficiency of these chiral molecules as spin filters was correlated with the reduction in the over-potential measured in cells where the anode electrode is coated with them. Since it is known that the over-potential relates to the chemical process on the anode [1, 5], the experimental methods focused on the anodic reactions. In this part of the reaction, if water is split, two water molecules must be oxidized to form a single oxygen molecule in its triplet ground state. The formation of the triplet oxygen requires a specific spin correlation between the transferred electrons.

The chiral-induced spin selectivity (CISS) effect [4] indicates that molecular chirality and the spin preferred in electrons transported through these molecular systems are correlated.

The inventors of the present invention have found that in a cell in which the electrode carries (is coated with) a chiral system, the over-potential required for hydrogen production drops remarkably, as compared with cells containing achiral systems. The spin specificity of electrons transferred through chiral system is the origin of a more efficient oxidation process in which oxygen is formed in its triplet ground state. The reduction of over-potential is therefore due to a correlation that exists in the spins' alignment in the atoms composing the oxygen molecules.

The inventors of the present invention have found that by using chiral system for electron transfer in water splitting system (i.e. the electrode that is used for water oxidation comprises chiral system) it is possible to enhance the rate of the hydrogen production. The inventors have shown that the over-potential (the electric potential at which the process starts) can be reduced from about 0.6 V to 0.2 Volts. As a result, the efficiency of the cell increases dramatically as well as the selectivity of the oxidizing process.

The present invention therefore provides a novel electrode for use as a working electrode in an oxidation process, e.g. in a (photo)electrochemical cell. The electrode has an electrically conductive surface carrying a chiral system, for example as a layer of chiral molecules, chiral polymer or chiral organic and/or inorganic film.

Thus, the present invention provides for eliminating or at least significantly reducing the over-potential required for water splitting thus for hydrogen production from water.

In some embodiments, the substrate of the electrode is configured as a photoabsorber.

In some embodiments, the electrode comprises at least one layer of photoabsorber carried by the substrate. The electrode may be configured as a photoabsorber by providing for example at least one of a layer/film of photoabsorber molecules, a layer/film of photoabsorber having chiral properties or a layer of photoabsorbing nanoparticles. The photoabsorbing nanoparticles may be bound to the substrate via the chiral system.

The present invention also provides a novel electrochemical cell using such an electrode carrying a chiral system.

The present invention also provides a novel water splitting system comprising at least one electrochemical cell using such an electrode carrying a chiral system.

The present invention further provides a novel water splitting method using spins' alignment effect. The method comprises operating an electrochemical cell to cause oxidation of water at an electrode of the electrochemical cell, while aligning spins of electrons released by oxygen during said oxidation. The aligning of the spins of electrons may be performed by using a chiral system in the electrochemical cell. The operating of the electrochemical cell comprises excitation of an anode resulting in the formation of electrons and electron holes causing the oxidation of water at the anode by holes and alignment of the spins of electrons by the chiral system at the anode.

In some embodiments, the anode is configured as a photoabsorber. The excitation is light-induced.

In some embodiments, the operating of the electrochemical cell comprises application of a potential difference between anode and cathode electrodes; transport of H+ ions from the anode to a cathode through an electrolyte and transport of electrons from the anode to the cathode through an external circuit; and reduction of hydrogen ions at the cathode by electrons to thereby produce hydrogen.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which:

FIG. 12 is a table that presents molecules studied.

DETAILED DESCRIPTION OF EMBODIMENTS

Figure 1A:
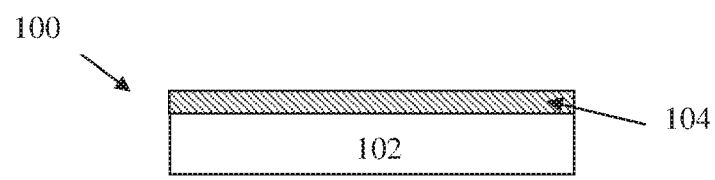
FIG. 1A schematically represents the novel electrode of the present invention.

Reference is made to FIG. 1A schematically representing an electrode configured according to the present invention. The novel electrode of the present invention can be immersed in an electrolyte to be used in an oxidation process and can be incorporated in a water splitting cell aimed at producing oxygen and/or hydrogen or at reducing $CO_2$. The electrode 100 comprises a substrate 102 having an electrically conductive surface carrying a chiral system 104. This may be at least one layer of chiral molecules chemically bound upon the surface of the substrate 102 or physically adsorbed on it.

When the electrode 100 is used as a working electrode in an electrochemical cell during an oxidation process, the chiral system on the electrode enables to control the spin alignment of electrons transferred between the substrate and electrolyte. In the case of water splitting, this allows efficient formation of the triplet ground state of the oxygen molecule.

The use of the electrode with chiral system provides a specific spin correlation between the transferred electrons, enabling the formation of the triplet. The chiral system therefore acts as spin filter and reduces the over-potential measured in the cell. This novel structure enables a spin alignment controlled water oxidation. In the case of a film made from chiral molecules, the chiral molecules may be chemically bounded to the substrate via a functional group, may be in the form of a chiral organic film or of an inorganic chiral film. The functional group may be a carboxylic group, a phosphate group, an amine group etc. . . .

The chiral system 104 includes for example one or more of the following: oligopeptides, amino acids, DNA, helicenes, or chiral conductive polymer.

Optionally, the substrate can be made of at least one metal or semiconductor. The substrate can optionally be amorphous, polycrystalline or single crystalline.

Optionally, the at least one monolayer can be self-assembled on the substrate, produced for example in a wet chemical procedure. The at least one monolayer can optionally comprise organic molecules. The molecules of the at least one monolayer can optionally be thiolated molecules. An example of the thiolated molecules suitable for the electrochemical cell device of the invention can include, but is not limited to, double stranded DNA. Double stranded DNA is chiral both because of its primary structure and because of its secondary, double helix structure. The molecules can have a predetermined length, e.g. the double stranded DNA can comprise for example 26, 40, 50, 78 or any other number of base pairs (bp) as considered appropriate for particular application of the present invention.

Figure 1B:
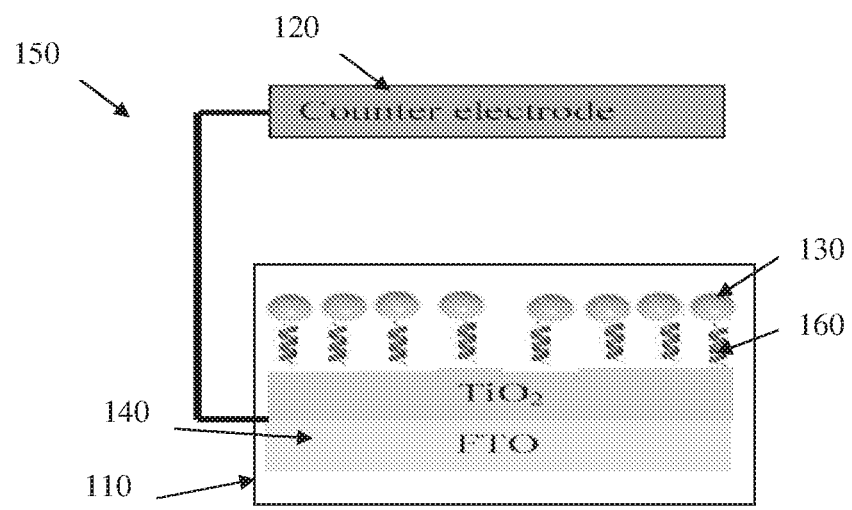
FIG. 1B schematically represents an example of a novel electrode of the present invention including semiconducting CdSe nanoparticles bound to the TiO2 through chiral molecules.

The novel electrode of the present invention may be incorporated in an electrochemical cell to be used under dark or light induced conditions. Reference is made to FIG. 1B representing an embodiment of a water splitting system comprising an electrochemical cell 150 configured and operable according to the present invention. In the present non-limiting example, the photoelectrochemical cell 150 is used which includes a photo anode 110 configured according to the invention, and a counter electrode 120. The water is oxidized to form two OH$^-$ groups, while on the counter electrode 120 it is reduced to form hydrogen and OH$^-$.

Generally, the photo-anode 110 is configured as a photoabsorber with chiral properties. In this specific and non-limiting example, the photo anode 110 comprises a $TiO_2$ substrate 140 coated by a chiral system formed by a layer of chiral molecules 160. Also, in this non-limiting example, the photo anode 110 comprises semiconductor photoabsorbing nanoparticles 130 attached to the $TiO_2$ substrate 140 via the chiral molecules 160. It should, however, be understood that additionally or alternatively, the substrate itself (or at least the surface thereof) may have photoabsorber properties as will be described further below, or photoabsorber chiral molecules can be used such as Porphyrines.

Porphyrines chiral molecules may be bounded to the $TiO_2$ electrode for example by incubation of a $TiO_2$ substrate in porphyrin solutions for 40 hours. The substrate can also be formed by any other material, e.g. different metal(s) and/or semiconductor(s). In a non-limited example, the semiconductor nanoparticles 130 are CdSe attached to a $TiO_2$ substrate 140 via thiolated oligopeptide 160. In this specific example, the attachment of the nanoparticles 130 to the titania substrate 140 is made by oligopeptide, (COOH)-(Ala-Aib)$_n$-NH—(CH$_2$)$_2$—SH 160, having α-helix shape. The molecules are attached to the titania through a carboxylic group and to the nanoparticles through the thiol group.

Chiral molecules, such as the molecule 160, may be characterized by certain spatial and geometrical asymmetries, otherwise known as chirality or handedness. Thus, for example, the helical structure of molecule 160 can render it either as a left handed chiral molecule, or a right handed chiral molecule. While exemplary embodiments of the present technique may utilize helical chiral molecules, the present technique may also be applicable to other types of chiral molecules, i.e., those not necessarily possessing a helical structure.

In a specific and non-limiting example, the novel electrode of the present invention was prepared as follows: $TiO_2$ nanoparticulate films were deposited on fluorine-doped tin oxide (FTO, surface resistivity of about 7 Ω/sq) coated glass, purchased from Sigma Aldrich Co., using the electrophoretic deposition (EPD) technique. This technique has been used previously to deposit uniform $TiO_2$ films. A suspension of $TiO_2$ nanoparticles (NPs) was prepared by dispersing 0.4 g $TiO_2$ NP (<25 nm in diameter and 99.7% trace metals, from Sigma Aldrich) in 40 mL of de-ionized water. Prior to making dispersions, $TiO_2$ nanoparticle powders were heated at 300° C. for 1 hr. The mixture was stirred overnight to ensure homogeneity. Prior to nanoparticle deposition, the FTO substrates were boiled in isopropanol for 15 minutes, followed by 15 minutes of boiling in ethanol, and finally rinsed with de-ionized water. After having been rinsed, the substrates were dried using nitrogen gas and annealed for 15 minutes at T=570 K. EPD was then performed with a Princeton potentiostat using the galvanic pulses mode technique with two pulses (Pulse 1 and Pulse 2).

Pulse 1 was set to 0 mA for 200 s for depolarization. Pulse 2 has current values ranging from 0.50 to 0.95 mA (producing a maximum potential of 7.0 V). Pulse 2 was applied for 1000 s in each cycle for polarization, and the number of iterations (pulse 1 followed by pulse 2) was set to 750. Various cycles were used to prepare films of required thicknesses. The samples were annealed in between cycles at 570 K for 15 minutes in air. During EPD, the suspension was continuously stirred using a magnetic stirrer. After completion of the last cycle, the electrodes were annealed again for 8 hours.

To confirm the surface coverage of the EPD-deposited $TiO_2$ NP on FTO, high-resolution scanning electron microscope (SEM) measurements were performed using In-lens-detector imaging with a LEO-Supra 55 VP. An average film thickness of around 6.8 μm was measured, using the Dektak stylus profilometer.

$TiO_2$ films were functionalized using organic linker chiral molecules in order to attach the CdSe NP. In this study, (COOH)-(Ala-Aib)$_5$-NH—(CH$_2$)$_2$—SH (Al5), (COOH)-(Ala-Aib)$_7$-NH—(CH$_2$)$_2$—SH (Al7), were used as linkers. The oligopeptide was dissolved in dimethyl formamide (DMF) to afford a 0.10 mM solution. The 1.0×1.5 cm$^2$ electrodes coated with $TiO_2$ were then immersed into the linker molecule solutions for an incubation period of 48 hours.

Single-stranded DNA (ssDNA), a 40-base oligonucleotide (40 bp) was used with the following sequence: 5'-AAA GAG GAG TTG ACA GTT GAG CTA ATG CCG ATT CTT GAG A/3AmMO/-3' and complementary DNA (comp-DNA) oligomer with the sequence 5'-TCT CAA GAA TCG GCA TTA GCT CAA CTG TCA ACT CCT CTT T/3ThioMC3-D/-3'. 200 μL of double-stranded DNA (ds-DNA) was prepared by mixing 20 μL of the HS-ssDNA with 22 μL of its complementary DNA from a stock solution of 100 μM. 70 μL of the solution was adsorbed on the $TiO_2$ electrodes.

Prior to adsorption of the dsDNA molecules, the electrodes were cleaned using ethanol and water. The surface was functionalized using terephtalic acid. To this end, 10 mM of terephtalic acid solution was prepared in 10 mL, of water and 100 μL of triethylamine. The electrodes were incubated in the terephtalic acid solution for 12 hours, followed by rinsing with water. The previously functionalized surface for amide bond formation with the dsDNA was then activated by incubating the electrodes in a mixture of 60 mM N-Hydrosuccinimide and 30 mM ethyl-N,N-dimethyl-carbodiimide, which was dissolved in 0.8 M phosphate buffer. Electrodes were incubated for 15 hours.

Finally, the dsDNA was adsorbed by keeping the electrodes for 24 hours in a controlled humidified environment, after which the samples were rinsed with 0.4 M phosphate butler and de-ionized water to remove any excess of DNA and salts. They were then blown dry using nitrogen gas. The electrodes were then immersed into the CdSe nanoparticle solution for at least 3 hours.

CdSe nanoparticles (about 7 nm diameter from MK Impex Corp.) were used in this study. The MKN-CdSe-T640 nanoparticle dispersion was mixed with toluene to afford a concentration of 22.5 mM. The functionalized $TiO_2$ electrodes were then incubated in the CdSe nanoparticle dispersions for at least 3 hours to ensure the adsorption of CdSe nanoparticles to the S-terminal of the linker molecules. The electrodes were then rinsed thoroughly in toluene to remove the physisorbed NP, and finally dried with nitrogen gas.

Photoelectrochemical measurements were performed in a three-electrode electrochemical cell, with Pt wire used as a counter electrode and with an Ag/AgCl (saturated KCl) reference electrode. A mixture of 0.35 M $Na_2SO_3$ and 0.25 M $Na_2S$ aqueous solution (pH=9.5) was used as the electrolyte. The $Na_2S$ sacrificial reagent plays the role of hole scavenger, and is oxidized to $S_2^{2-}$ to prevent the photocorrosion of CdSe.

To ensure efficient hydrogen production at the cathode, $Na_2SO_3$ was added to reduce disulfides back to sulfides, $S_2^{2-}+SO_3^{2-}=S^{2-}+S_2O_3^{2-}$, which has been shown to significantly increase the amount of hydrogen produced. A commercial Xe lamp with an intensity of 80 mWcm$^{-2}$ was used to illuminate the photoelectrodes.

As described above, the electrode structure of the invention (i.e. a substrate having electrically conductive surface carrying chiral system) may be used with another electrode to form an anode-cathode pair through which an electric potential is applied for hydrogen production. Three experimental configurations for hydrogen production, were probed. In the first configuration, water is split to produce hydrogen and oxygen in an electrochemical cell in which a $TiO_2$ anode is coated with either chiral or achiral self-assembled molecular layer(s) for the sake of comparison. In the second configuration, the same anode was used, but hydrogen was photo-generated using sacrificial electrolytes, such as $Na_2S$ and $Na_2SO_3$. Namely, here the sulfide is oxidized instead of oxygen via a multiple electron oxidation process. In both configurations, a three-electrode electrochemical cell was used, with a Pt wire as the cathode and Ag/AgCl (saturated KCl) as the reference electrode. In the third configuration the $TiO_2$ anode is coated either with chiral or achiral porphyrines for the sake of comparison.

FIG. 12 presents the molecules studied in both experimental configurations.

In this specific and non-limiting example, the chiral molecules are either oligopeptides, [L-(COOH)-(Ala-Aib)$_5$-NH—(CH$_2$)$_2$—SH, and L-(COOH)-(Ala-Aib)$_7$-NH—(CH$_2$)$_2$—SH] having an α-helix structure, or 40 base-pair-long DNA. The molecules are bound to the titania surface through a carboxylic group, and in the second configuration CdSe nanoparticles are bound to the molecules through a thiol group. On this electrode, electrons are transferred from solution during oxidation, whereas on the counter electrode water is reduced to form hydrogen.

The results obtained for all the molecules are presented in Table 1 indicating the molecules, their lengths, and the potentials measured in the photo-electrochemical cells containing them.

TABLE 1

| Electrode | Molecular Length/Å | $E_{app}$[a] V vs Ag/AgCl | $E_{fb}$ Flat band potential vs Ag/AgCl (V) | $E_{app} - E_{fb}$ (V) | η Effective over-potential[b] |
|---|---|---|---|---|---|
| TiO$_2$/Al7 | 25 | 0.25 | −0.83 | 1.08 | 0.17 |
| TiO$_2$/Al5 | 22 | 0.25 | −0.68 | 0.93 | 0.02 |
| TiO$_2$/DNA[Chiral] | 130 | 0.30 | −0.61 | 0.91 | 0 |
| TiO$_2$/MUA | 14 | 0.70 | −0.95 | 1.65 | 0.74 |
| TiO$_2$/MPA[Achiral] | 6 | 0.70 | −0.94 | 1.64 | 0.73 |
| TiO$_2$/4MBA | 8 | 0.30 | −1.11 | 1.41 | 0.5 |
| TiO$_2$/3MBA | 7 | 0.30 | −1.20 | 1.50 | 0.59 |

Here, index [a] corresponds to potential applied to the TiO$_2$ electrode versus the Ag/AgCl reference electrode to produce hydrogen, and index [b] corresponds to effective over-potential calculated with respect to the $E_{app}$-$E_{fb}$ value of the TiO$_2$/DNA system.

The actual potential required for driving the photoelectrochemical process depends on the flat-band potential ($E_{fb}$) of the semiconductor electrode. This quantity is a measure of the potential that must be applied to the semiconductor, relative to some reference electrode, so that the bands remain flat as the interface is approached. Thus, the over-potential (η) is given by $$\eta = E_{app} - E_{fb} - E_{th}, \quad (1)$$

where $E_{app}$ is the potential at which hydrogen appears and $E_{th}$ is the thermodynamic value for the potential at which the reaction takes place. The values for $E_{fb}$ were obtained from the Mott-Schottky plot as measured from impedance spectroscopy. Here the effective over-potential is refereed to, when $E_{th}$ is taken as the value of $E_{app}$-$E_{fb}$ obtained with DNA molecules as a linker, which has the lowest value for $E_{app}$-$E_{fb}$. The 4 MBA molecule is special because it is an exceptionally efficient electron conductor and has a highly negative flat band potential ($E_{fb}$), as discussed below. As shown in Eq. (1), if the value of $E_{fb}$ is highly negative for the same over-potential, $E_{app}$ is very low compared with other achiral molecules.

To obtain an effective collection of the produced hydrogen gas, different potentials were applied to the photoelectrical cell of some embodiments of the present invention. Hydrogen gas evolution was measured at various potentials using the Princeton potentiostat in the chronoamperometry mode, under light illumination. The produced hydrogen gas was measured in an air-tight H-cell. Potentials varying from 0.25 V to 0.70 V versus Ag/AgCl were applied in the chronoamperometry mode to the working electrode while H$_2$ production was monitored on the cathode.

Table 2 shows applied potentials for effective collection of the produced hydrogen gas.

TABLE 2

| Electrode | Applied Potential vs Ag/AgCl (V) | H$_2$ production observed |
|---|---|---|
| TiO$_2$/Al5/CdSe | 0.25 | yes |
| | 0.30 | yes |
| | 0.70 | yes |
| TiO$_2$/Al7/CdSe | 0.25 | yes |
| | 0.30 | yes |
| | 0.70 | yes |
| TiO$_2$/DNA/CdSe | 0.25 | no |
| | 0.30 | yes |
| | 0.70 | yes |

TABLE 2-continued

| Electrode | Applied Potential vs Ag/AgCl (V) | H$_2$ production observed |
|---|---|---|
| TiO$_2$/4MBA/CdSe | 0.25 | no |
| | 0.30 | yes |
| | 0.70 | yes |
| TiO$_2$/3MBA/CdSe | 0.25 | no |
| | 0.30 | yes |
| | 0.70 | yes |
| TiO$_2$/MUA/CdSe | 0.25 | no |
| | 0.30 | no |
| | 0.70 | yes |
| TiO$_2$/MPA/CdSe | 0.25 | no |
| | 0.30 | no |
| | 0.70 | yes |

Figure 2A:
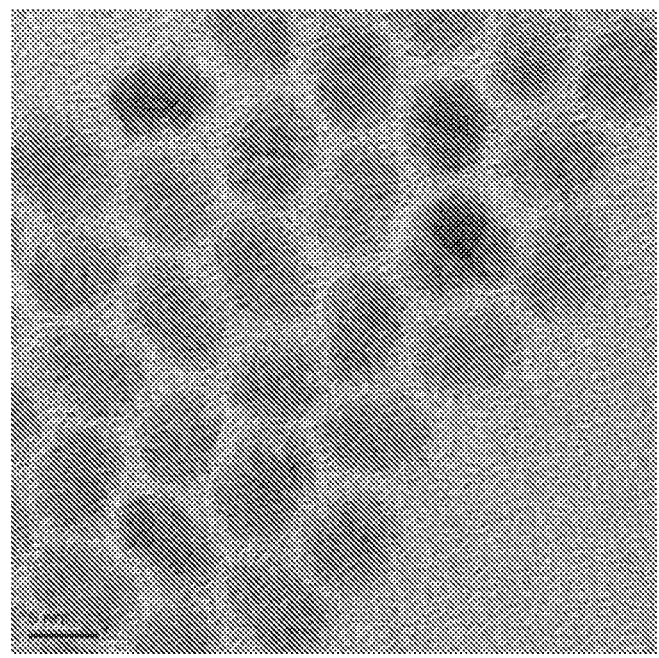
FIGS. 2A-2E are TEM images of CdSe nanoparticles (FIG. 2A); CdSe anchored to TiO2 nanoparticles (FIGS. 2B-2C); the FFT pattern obtained from regions marked as I in FIG. 2C (FIG. 2D) and the FFT pattern obtained from region II in FIG. 2D (FIG. 2E)
Figure 2B:
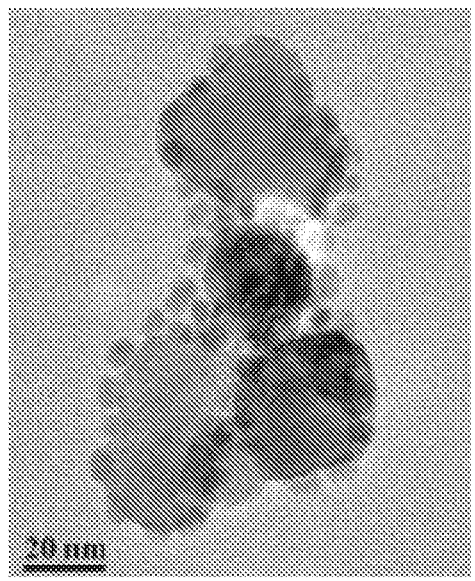
Figure 2C:
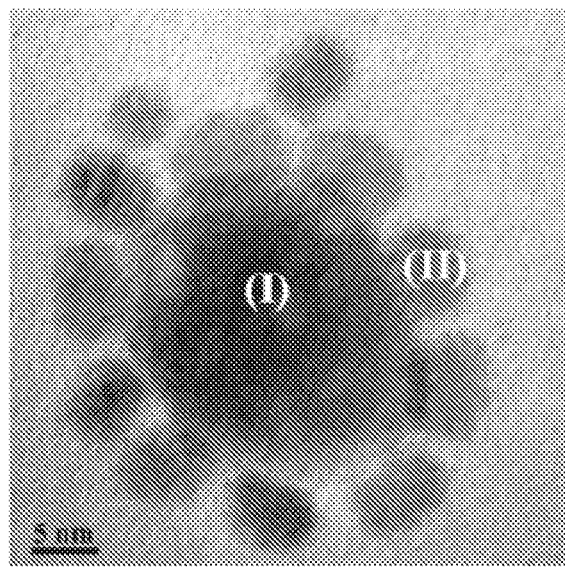
Figure 2D:
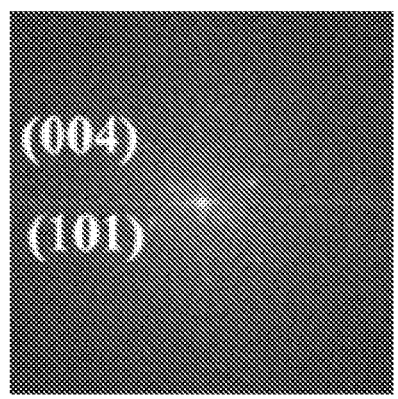
Figure 2E:
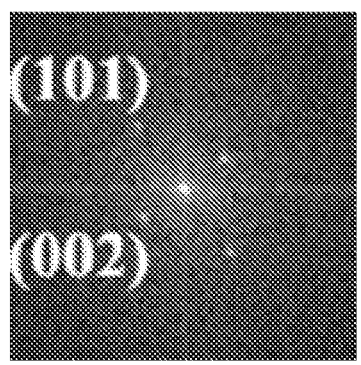

To confirm the structure of the electrode, TEM measurements were conducted as illustrated in FIGS. 2A-2E. Samples for TEM analysis were prepared by drop casting 5 µL toluene dispersions of TiO$_2$-oligopeptide-CdSe onto a carbon-coated copper grid, followed by air drying. Prior to TEM measurements, the samples were kept in vacuum for 12 hours. TEM was performed on a Philips T12 transmission electron microscope operating at 120 kV and equipped with a TVIPS CCD digital camera. FIG. 2A shows a TEM image of CdSe nanoparticles; FIGS. 2B-2C show a TEM image of CdSe anchored to TiO$_2$ nanoparticles. As clearly shown, several CdSe nanoparticles are attached to one TiO$_2$ particle; FIG. 2D shows a TEM image of a FFT pattern obtained from regions marked as I (FIG. 2C) and FIG. 2F shows a TEM image of a FFT pattern obtained from region II (FIG. 2D). The FFT images confirm the crystalline structure of the particles used.

Figure 3A:
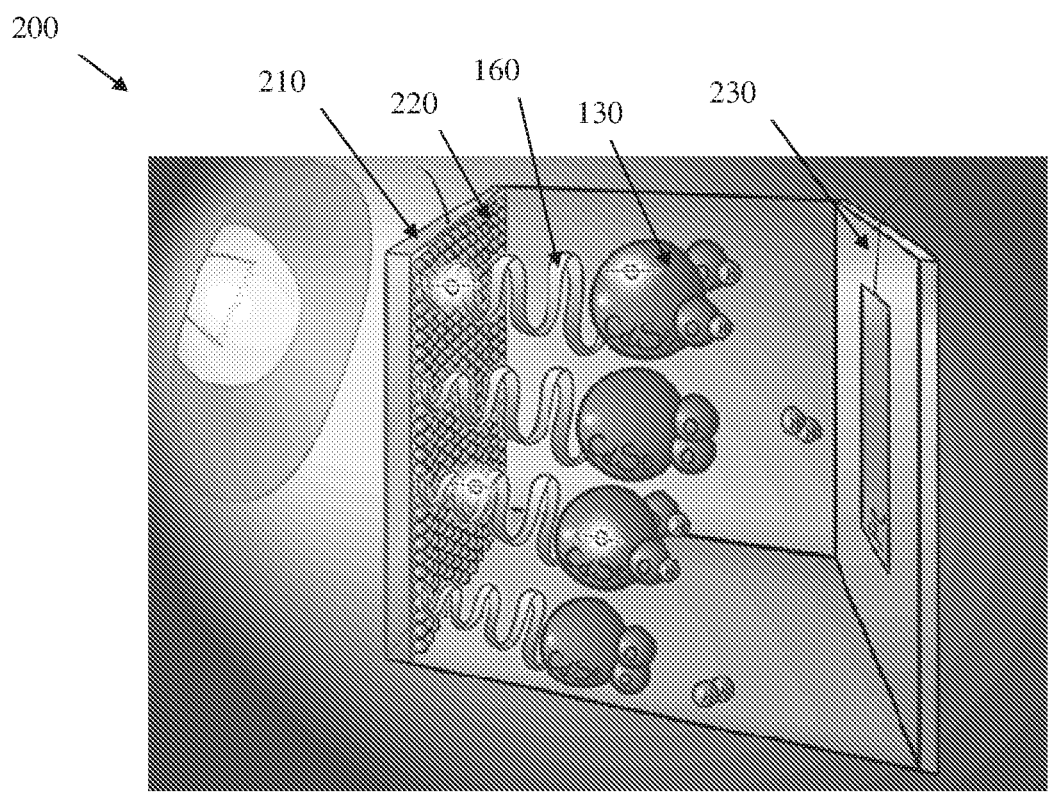
FIG. 3A is a scheme of a novel photoelectrochemical cell according to some embodiments of the present invention.
Figure 3B:
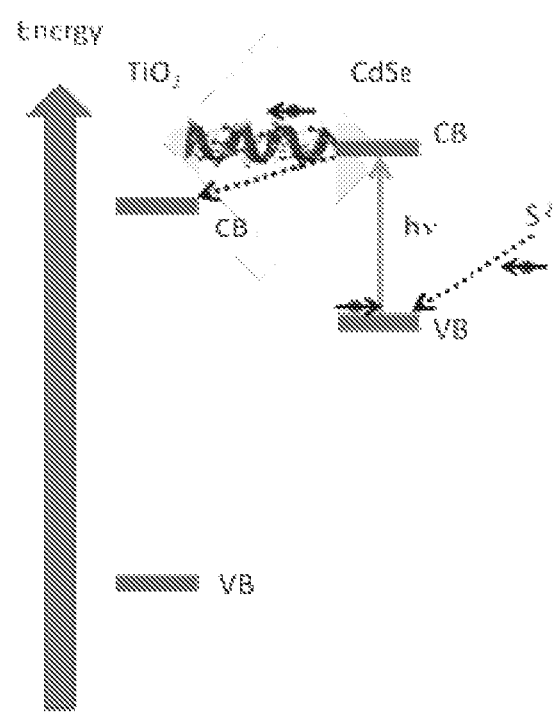
FIG. 3B is a scheme of the electron transfer between $S^{-2}$ and TiO2 nanoparticles.

FIGS. 3A-3B present a cartoon of an example of a novel electrochemical cell 200 of the present invention which can be used for water splitting and a qualitative scheme of the energy levels involved in the excitation/oxidation process occurring at the electrode of the present invention respectively. In this specific and non-limiting example, TiO$_2$ particles 220 are attached to a fluorine-doped tin oxide (FTO-surface resistivity ~7 Ohm/sq) conductive electrode 210. CdSe nanoparticles 130 are attached/bound to the TiO$_2$ nanoparticles 220 by various molecular linkers 160 including chiral ones. On a Pt electrode 230, the H$^+$ ions are reduced to form H$_2$. When the electrochemical cell was used, a mixture of Na$_2$SO$_3$ and Na$_2$S aqueous solution (pH=9.5) was used as the electrolyte. The Na$_2$S plays both the role of a hole scavenger and that of a sacrificial anodic electroactive species, and is oxidized to S$_2^{2-}$, and eventually to S$_2$ sulfur dimer ($^3\Sigma_g$ ground state), thus preventing the photocorrosion of CdSe and enhancing the hydrogen production. An Xe lamp with an intensity of 80 mWcm$^{-2}$ was used for illuminating the photoelectrodes. Hydrogen gas evolution was monitored at various potentials using a potentiostat in the chronoamperometry mode under illumination. The evolved hydrogen gas was measured in an air-tight H-cell.

FIG. 3B illustrates a cell operation based on photoexcitation of the CdSe nanoparticles, while a potential is applied to the $TiO_2$ electrode in reference to the saturated Ag/AgCl electrode. The figure illustrates the electron transfer between the $S^{-2}$ and the $TiO_2$ nanoparticles. Upon excitation (photoexcitation) of the CdSe nanoparticles, at least one excited electron is transferred from the CdSe nanoparticles through the chiral molecules to the $TiO_2$ electrode (from there to the external circuit), leaving a hole in the nanoparticle. Electrons produced (released) in the sulfur oxidation process are then transferred to the nanoparticle, and $S_2^{2-}$ is produced. Thus, the efficiency of the cell depends on the efficiency of electrons transfer from the photoexcited CdSe nanoparticles to the titania substrate. The molecules used as linkers between the nanoparticles and titania and their respective lengths are listed in FIG. 1 and Table 1 above. This transfer is a spin-specific electron transfer, since the transfer through the chiral molecule is preferred for one spin over the other. Thus, the hole in the CdSe has a well-defined spin alignment, and therefore electrons with this spin will be transferred from the anions in the solution to CdSe.

In the first configuration described above (water splitting), measurements were performed in a solution of 0.1 M $Na_2SO_4$, pH 6.32 at a scan rate of 50 mV/s.

Figure 4:
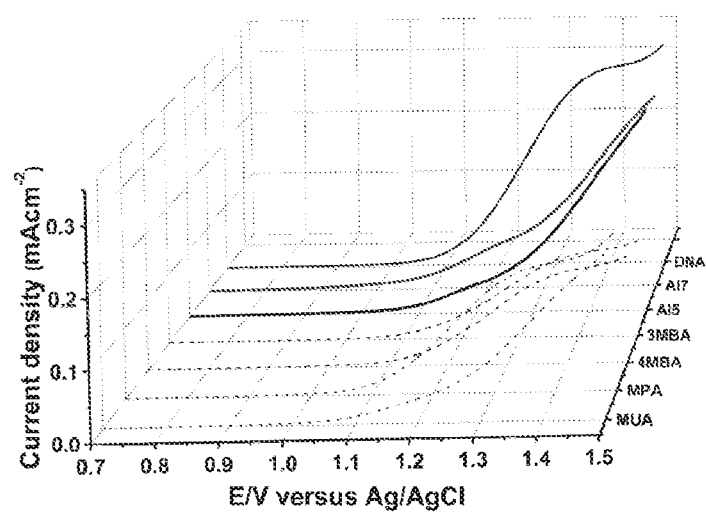
FIG. 4 shows current density as a function of a potential versus an Ag/AgCl reference electrode, using novel electrodes of the present invention made with different materials for the sake of comparison in the dark.

FIG. 4 presents the current density, as a function of the potential versus the Ag/AgCl electrode, using the novel electrode of the present invention coated with self-assembled monolayers of either achiral (dashed lines) or chiral (solid lines) molecules for the sake of comparison. The molecules related to each curve are written on the right axis. The experiments were performed in the dark. The scan was performed up to 1.5V to avoid oxidation of the molecules and destruction of the organic monolayer. The gradients of the currents obtained with the chiral molecules at 1.5 V are much larger than those observed with the achiral counterparts. All the achiral molecules are much shorter than the chiral ones and several of them are highly conjugated (see Table 1). Hence, it is expected that the achiral molecules will conduct better and exhibit higher current. Actually, the opposite effect is observed and the chiral molecules have significantly lower threshold potentials for oxygen evolution, with a concomitant increase in the currents, than do the achiral molecules. The extreme case is the 13 nm-long DNA that exhibits high current despite being longer by about more than an order of magnitude than the MBA and MPA molecules. At a potential of 1.4 V, namely, an over-potential of less than 0.2 V, the current in the cells in which the anode is coated with chiral molecules is higher than for cells containing the achiral molecules.

The present work clearly supports the notion that electronic factors play a fundamental role in the origin of the over-potential. The results obtained with DNA and the oligopeptide are consistent with them being spin filters. With the very long DNA, in which the appearance potential is the lowest, the yield of hydrogen production is lower than for the shorter oligomers. These results are consistent with a 40-base-pair DNA sequence being a good spin filter, as compared with the oligopeptides that have lower spin polarizations; however, the electron transfer is more efficient through the shorter oligomers. This explains the high hydrogen production yield in cells in which the latter is used compared with a cell containing the DNA.

Figure 5A:
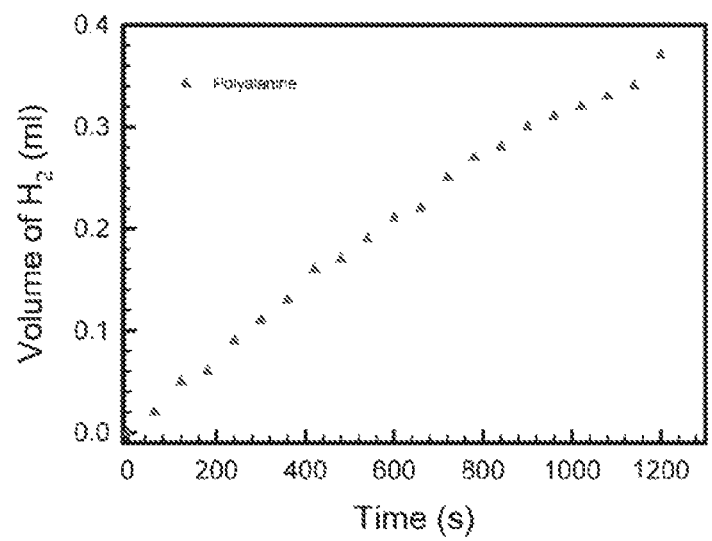
FIGS. 5A-5B show hydrogen production as function of time for two potentials 0.25 V (FIG. 5A) and 0.7V (FIG. 5B) from cells made with all the three molecules according to some embodiments of the present invention.
Figure 5B:
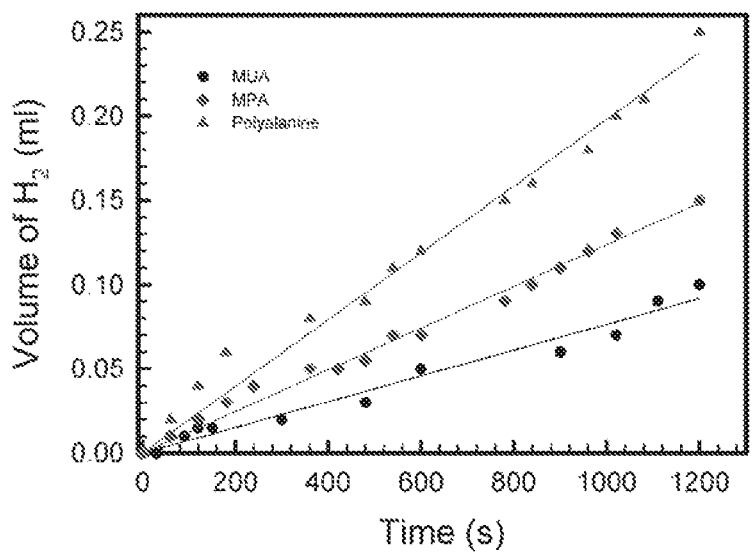

Reference is made to FIGS. 5A-5B representing hydrogen production as function of time for two potentials (0.25V and 0.7V respectively) under illumination. As shown in FIG. 5A, at 0.25 V only the novel electrode of the present invention made with the chiral polyalanine molecules produces hydrogen. At low potential (0.25 V) hydrogen is produced only with the novel electrode of the present invention with chiral molecules. In FIG. 5B, the hydrogen production is measured on three cells at higher potential (0.7V). As shown in the figure, the rate of production is higher by about 30% for the novel cell of the present invention made with polyalanine as compared to that made of C3 alkyl chain. At higher potential of 0.7 V, hydrogen is produced even when achiral molecules are used, but the rate of production is larger for the chiral molecules. The effect of the presence chiral molecules on the hydrogen production is clearly presented in FIGS. 5A-5B.

Figure 6:
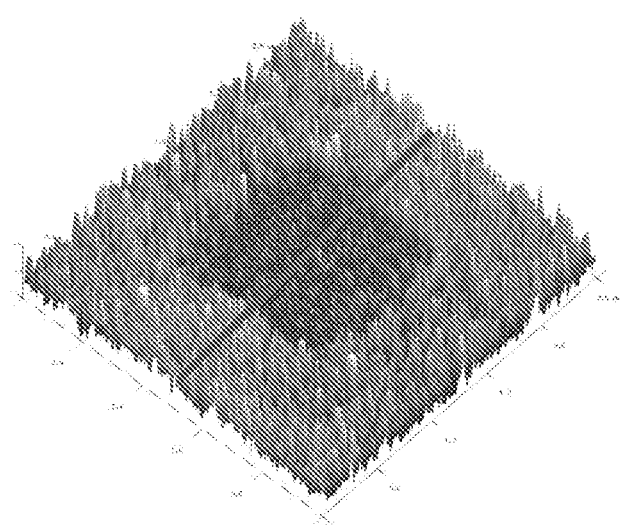
FIG. 6 is AFM topography of a monolayer of oligopeptide adsorbed on nickel according to the teachings of the present invention.

To verify the spin selectivity of electron transmission through the oligopeptide, spin-specific conductive AFM measurements were conducted following the procedure reported previously [6,7] as shown in FIG. 6. To confirm the spin selectivity of the electron transmission through the oligopeptides used in this study, conductive probe AFM (CP-AFM) measurements on molecules adsorbed on a Ni substrate were performed. The spin polarization measured is 18±5%, 25±5% and 80±5% for the A15, A17, and DNA samples, respectively. The polarization is defined as the difference in the current of the two spins over the sum. This amounts to ratios in transmission between the two spins that are 1:1.4, 1:1.7, and 1:6, respectively.

Self-assembled monolayers of oligopeptides were adsorbed on nickel substrates. Prior to the immobilization of the self-assembled monolayer, thin Ni films were thoroughly cleaned by placing them in boiling acetone and ethanol for 20 minutes each. Finally, the cleaned Ni samples were dipped in 0.1 mM solution of oligopeptide in dimethyl formamide for 24 hours.

The presence of oligopeptides on the Ni surface was confirmed using polarization-modulated infrared absorption spectroscopy (PMIRRAS) and atomic force microscopy. Infrared absorption spectroscopy in reflection mode was carried out using a Nicolet 6700 FTIR, at an incidence angle of 80°, equipped with a PEM-90 photo elastic modulator (Hinds Instruments, Hillsboro, Oreg.). Raw spectra were baseline-corrected by a spline algorithm. The PMIRRAS data represent two peaks located at 1660 and 1550 $cm^{-1}$. The former is due to C=O stretching vibration, commonly termed amide I, and the latter is derived from the C—N stretching mode and the bending mode of N—H bond (amide II) present in oligopeptide. The presence of these peaks confirms the formation of an oligopeptide monolayer on the Ni surface. In addition, the positions and the relative intensity ratio dictate the conformation of the peptide monolayer adsorbed on the Ni surface.

Microscopic transport measurements were performed using CP-AFM under different magnetic orientations. The measurements were carried out using a Multimode/Nanoscope (Bruker-Nano, Santa Barbara, Calif. USA). A PtIr-coated Si probe (Bruker, SCM-PIT, spring constant 1-5 N/m) was used. Peak force TUNA (PF-TUNA)™ mode was used for acquiring current (I) versus voltage curves (V) curves. In PF-TUNA mode, the tip taps on the surface at a frequency of 1 kHz, controlling the peak contact force (here, held to a few nN) at each tap; thus the tip forms a molecular junction. The tip simultaneously scans the surface at a rate of 1 Hz per scan line. I-V spectroscopy measurements were recorded by performing voltage ramps with the tip in contact with the surface at an applied force of about 5 nN. Using the ramping software, the tip was lifted between spectroscopy points at different places on the surface. At least 25 I-V curves were averaged for each configuration (Magnet UP and Magnet DOWN) by leaving spectra that exhibit shorting and insulating behavior.

Prior to I-V measurements, the nanoshaving method is utilized to measure the thickness of the oligopeptide monolayer on the Ni surface. A defined area (1 μm×1 μm) is scanned in contact mode by applying a large force on the AFM tip, which removes molecules present in that area due to their inherent flexibility of molecules, as shown in FIG. 6. FIG. 6 is an AFM topography of a monolayer of oligopeptide adsorbed on nickel. From the line profile, the thickness of the monolayer was found to be 2.8±0.2 nm.

Figure 7A:
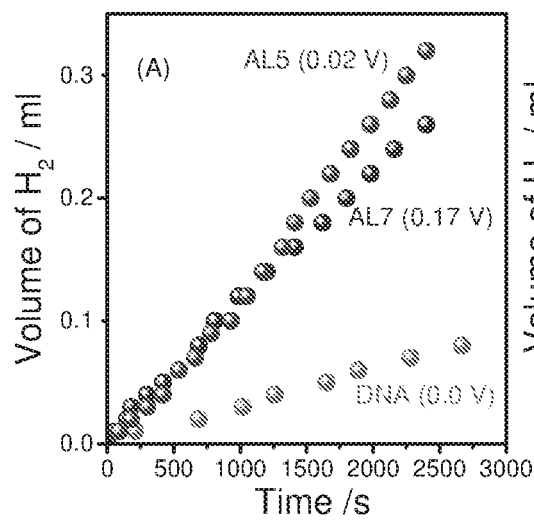
FIGS. 7A-7B show hydrogen production as a function of time for chiral molecules (FIG. 7A) and achiral molecules (FIG. 7B)
Figure 7B:
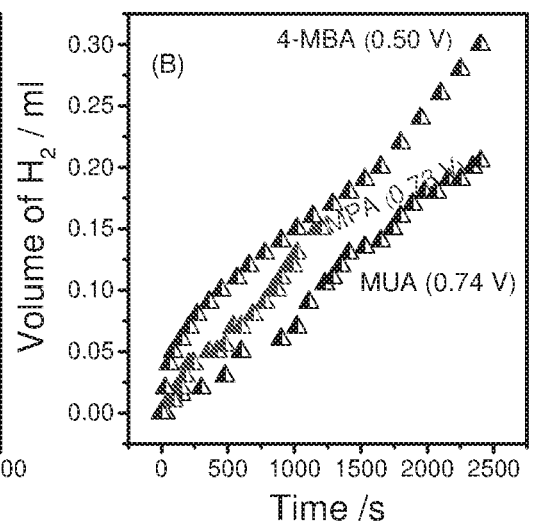

Reference is made to FIGS. 7A-7B presenting hydrogen production as a function of time for the chiral molecules and for the achiral molecules respectively. The potentials in the brackets refer to the over-potential as defined in Table 1 above. The measurements were conducted at $E_{app}$ for each of the molecules. The effect of the chiral molecules on the hydrogen production is presented in these figures. At low effective over-potential (η<0.5 V vs. Ag/AgCl), hydrogen is produced only when the working electrode includes the chiral molecules. At higher over-potentials, hydrogen is produced even when achiral molecules are used. FIG. 7A shows that the over-potential is lower for the molecule with the higher spin selectivity, and thus the cell that includes DNA exhibits the lowest effective appearance potential.

The open circuit potential (OCP) was measured in the dark and when the cell was illuminated. Besides 4 MBA, the light had a relatively small effect on the OCP, as expected since most of the molecules are poor conductors. Since 4 MBA is a good conductor, it indeed shows a large effect of light (see Table 1). In general there is no significant difference between the OCP of the chiral and achiral molecules.

The spin polarization of electrons conducted through the chiral molecules is scaled by the molecular length. On the other hand, the yield of hydrogen production also depends on the molecular conduction and in general, it decreases with increasing molecular length. Since all the chiral molecules used are longer than the achiral ones, the results clearly prove that the over-potential is dramatically reduced in the case of chiral molecules and that it is minimum for the molecule with the highest spin selectivity.

Figure 8:
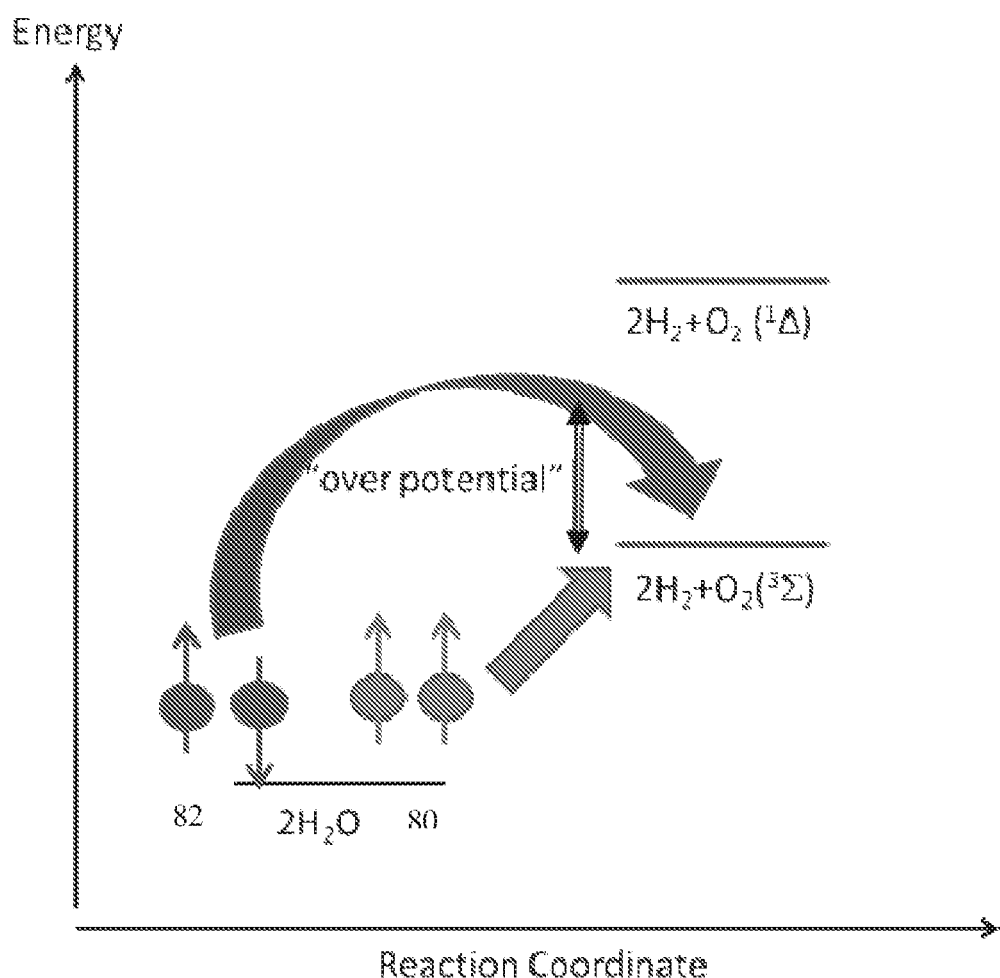
FIG. 8 is an energy scheme showing different mechanistic pathways for unpaired and paired photogenerated holes in the oxidation of water to oxygen and hydrogen.

The observations in the present study are consistent with the concept that the constraint of total spin conservation during the reaction process is responsible for the high over-potential observed in achiral systems. On the other hand, when electrons are conducted through chiral molecules, the conduction is intrinsically spin selective and therefore, the spins of the reacting atoms are co-aligned. FIG. 8 schematically presents the spin considerations related to oxygen/sulfur molecule formation from two oxygen/sulfur atoms in their triplet ground state. The energy scheme shown in FIG. 8 represents different mechanistic pathways for unpaired 80 and paired 82 photogenerated holes in the oxidation of water to oxygen and hydrogen. The atoms are in the ground state and each has a spin of 1 (triplet state) and their spins can be either aligned antiparallel 82 or parallel 80 to each other. If they are aligned parallel, they can form the triplet ground state of the oxygen molecule. However, if they are aligned antiparallel, their electronic state correlates with the excited singlet electronic state of the oxygen, which lies about 1 eV above the ground state. Hence, if they are on this singlet surface the formation of the oxygen ground state requires over-potential, since only when the two atoms are very close do their spins flip to form the molecular ground state. Therefore, to efficiently form hydrogen, the spins of the oxygen atoms must be pre-aligned, as indeed is the case when the electrodes are coated with chiral molecules.

Figure 9:
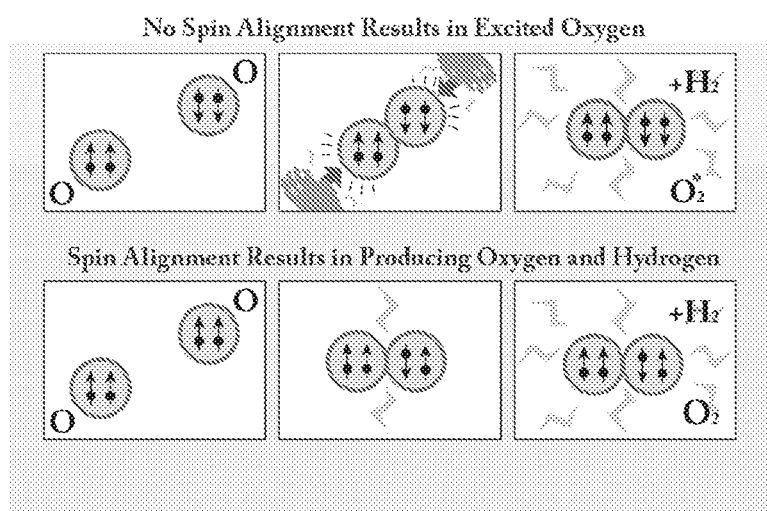
FIG. 9 is a scheme showing the correlation between spin alignment and production of hydrogen.

As illustrated schematically in FIG. 9, if the spin orientation of the two atoms is not the same, upon approaching each other, the atoms are situated on the repulsive singlet potential energy surface and therefore, the reaction that forms oxygen molecules will have a barrier. Hence, spin alignment should reduce the barrier of the reaction.

In the second experimental configuration, upon photoexcitation of CdSe nanoparticle, a singlet state is formed in which the electrons in the ground state and excited state are anti-correlated; however, the spin orientation is isotropic. With chiral molecular linkers, electrons transferred through molecules from nanoparticles to titania are spin dependent, namely, the isotropic distribution of the spin alignment, following photoexcitation, collapses to a well-defined spin orientation of the excited electrons. This is because only those electrons featuring one (up or down) spin state can be transferred efficiently through chiral molecules. The electron in the ground state is therefore left with a spin orientation that is anti-parallel to that of the transferred spin.

Hence, when an electron with a well-defined spin alignment is transferred from a nanoparticle, it leaves a hole in the nanoparticle with the same spin direction. As a result, the electrons being transferred from the hole scavengers in solution are all transferred with the same spin alignment, leaving all the atoms with the same unpaired spin direction. Therefore, the formation of the disulfide or the oxygen molecule can occur with a large cross-section. If spin alignment does not exist in the system, as it occurs with non-chiral molecules, the formation of the ground-state molecules requires the two atoms (sulfur or oxygen) to be in proximity, so that the exchange interaction between the spins will be strong enough to define the spin alignment. For this to occur, the distance between the oxygen atoms must be short, on the order of 0.1-0.2 nm, whereas if the spins are already aligned, the reaction can take place at a larger distance. Of course some spin randomization occurs in the nanoparticle, owing to spin-orbit coupling. However, the rates of the electron transfer processes compete well with the spin relaxation time, which is in the order of picoseconds.

An important contribution to the over potential was therefore observed in water splitting results from the barrier caused by the requirement that the atoms of the hole scavenger (oxygen or sulfur) have to be extremely close for the ground state of the molecule to form. By having "aligned spins", however, this requirement is relaxed and the barrier for the reaction is reduced; hence, the over-potential is reduced. Since key biochemical reactions in nature involve multiple electron reactions, like respiration, the results presented here indicate that spin selectivity may also be of paramount importance in other biological processes, as well as in multiple electronic processes used in industry, such as oxygen reduction.

Figure 10:
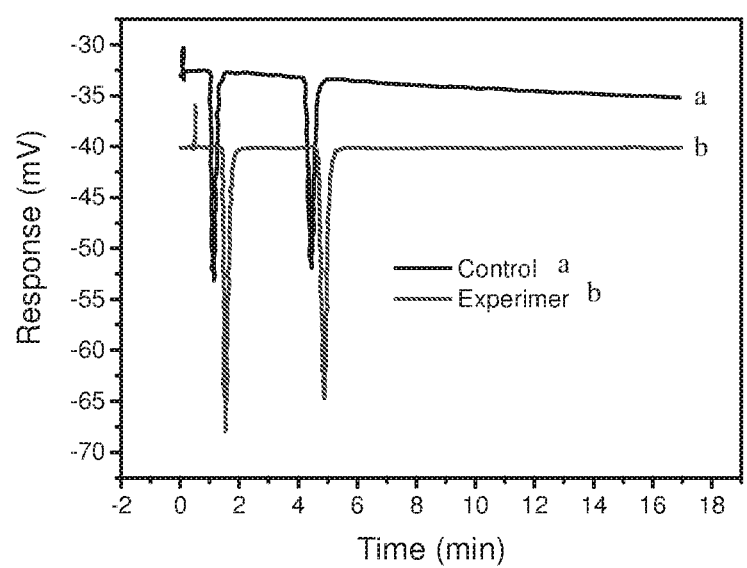
FIG. 10 shows a gas chromatogram obtained from a pure hydrogen (commercial) sample injected into the gas chromatography chamber and from a gas sample produced in the photoelectrochemical cell, injected into the gas chromatography chamber.

Reference is made to FIG. 10 representing a gas chromatogram obtained from a pure hydrogen (commercial) sample injected into the gas chromatography chamber (curve a) and from a gas sample produced in the photoelectrochemical cell, injected into the gas chromatography chamber (curve b). The gas chromatography chamber was equipped with a thermal conductivity detector (TCD) and a GowMac instrument was used with a 20'×⅛" stainless steel column packed with a molecular sieve (5 Å) in series with a 4'×⅛" stainless steel column packed with. HayeSep T. The carrier gas was Ar, and the column temperature was maintained at T=120° C. Prior to the measurements, the instrument was calibrated with a commercial high pure $H_2$ gas. The curves were displaced relative to each other to facilitate the comparison. The peak at 1.57 min relates to all heavy gases present in the sample, whereas the peak at 4.91 min corresponds to hydrogen. The gas produced at 0.25 V versus Ag/AgCl in an electrochemical cell was collected using a Hamilton syringe and injected into a gas chromatography column. As shown in FIG. 10, it is clear that the gas produced at the Pt electrode in the photoelectrochemical cell is hydrogen.

Figure 11:
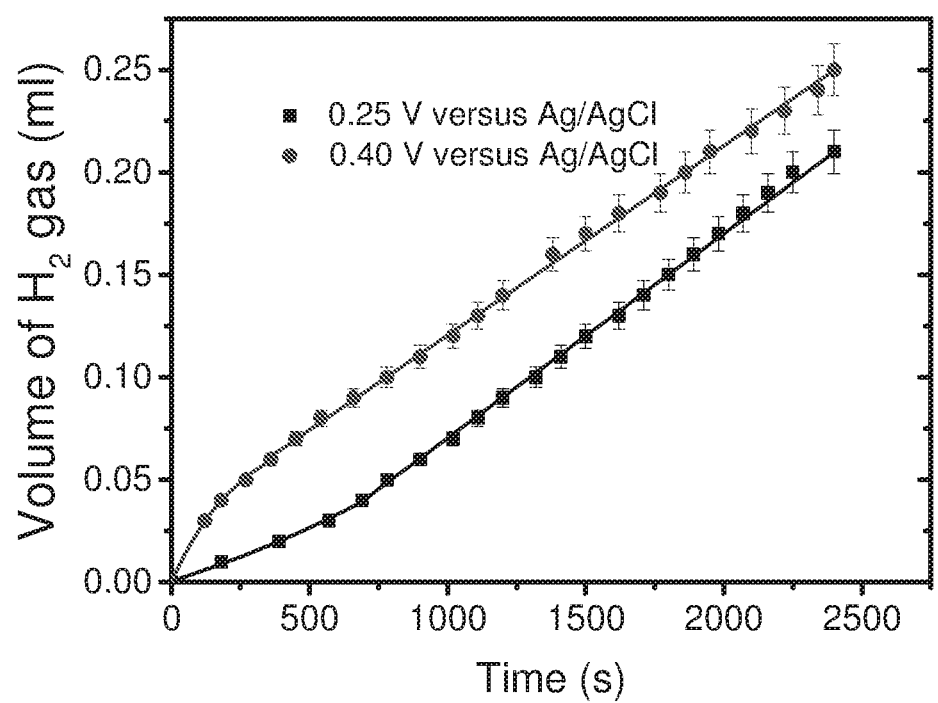
FIG. 11 shows hydrogen production as a function of time for two over-potentials, when the electrode used contained the long oligopeptide SHCH2CH2CO-(Ala-Aib)7-COOH.

Two oligopeptides were studied: L-(COOH)-(Ala-Aib)$_n$-NH—(CH$_2$)$_2$—SH when n=5 and 7. The yield of hydrogen production was by about a factor of 4.0 higher for the short oligomer (n=5). FIG. 11 presents the hydrogen production as a function of time for two over-potentials, when the electrode used contained the long oligopeptide SHCH$_2$CH$_2$CO-(Ala-Aib)$_7$-COOH at 0.25 and 0.40 V versus Ag/AgCl. Although the yield here is lower than with the shorter oligopeptide, hydrogen is produced at over-potential as low as 0.25.

The invention claimed is:

1. A water splitting system comprising at least one electrochemical cell comprising an anode electrode and a cathode electrode, connectable to each other, to be immersed in an electrolyte for use in an oxidation process;
   said cathode electrode being configured and operable to cause reduction of hydrogen ions by electrons;
   wherein said anode electrode comprises a substrate having an electrically conductive surface carrying a chiral system, wherein, upon application of a potential difference between said anode electrode and said cathode electrode, said anode electrode is configured and operable to create electrons and electron holes causing oxidation of water and transfer to electrons between the electrolyte and the substrate;
   wherein said chiral system causes alignment of the spin of transferred electrons released by oxygen during the oxidation of water to thereby create a spin specificity of the electrons transferred through said chiral system and decrease over potential for the oxidation process;
   wherein the water splitting system is configured to cause a potential difference to be applied between the anode electrode and the cathode electrode in which the over-potential for the oxidation process is reduced due to the alignment of the spin of the electrons transferred through said chiral system.

2. The water splitting system of claim 1, wherein said chiral system comprises at least one of organic and inorganic matter having chiral properties.

3. The water splitting system of claim 1, wherein said chiral system comprises at least one of chiral molecules and chiral polymer.

4. The water splitting system of claim 1, wherein said chiral system is configured as a single- or multi-layer structure.

5. The water splitting system of claim 4, wherein said chiral system comprises a self-assembled monolayer of the chiral molecules.

6. The water splitting system of claim 1, wherein said chiral system includes at least one of the following: oligopeptides, amino acids, DNA, helicenes, and chiral conductive polymer.

7. The water splitting system of claim 1, wherein said chiral system is either chemically bound to said electrically conductive surface of the substrate or physically adsorbed on it.

8. The water splitting system of claim 1, wherein said substrate is made of at least one metal or semiconductor.

9. The water splitting system of claim 1, wherein said anode electrode is configured as a photoabsorber.

10. The water splitting system of claim 9, wherein said substrate is configured as a photoabsorber.

11. The water splitting system of claim 9, further comprising at least one layer of photoabsorber carried by the substrate.

12. The water splitting system of claim 9, wherein said chiral system comprises at least one layer of photoabsorber having chiral properties.

13. The water splitting system of claim 9, comprising photoabsorbing nanoparticles bound to the substrate via said chiral system.

14. A water splitting method comprising: operating the electrochemical cell of the water splitting system of claim 1 to cause oxidation of water at the anode electrode of the electrochemical cell, while aligning spins of electrons released by oxygen during said oxidation.

15. The method of claim 14, wherein said aligning of the spins of electrons is performed by using the chiral system in the electrochemical cell.

16. The method of claim 15, wherein said operating of the electrochemical cell comprises: excitation of the anode resulting in the formation of electrons and electron holes causing the oxidation of water at the anode by holes and alignment of the spins of electrons by the chiral system at the anode.

17. The method of claim 16, wherein said anode is configured as a photoabsorber, said excitation being light-induced excitation.

18. The method of claim 14, wherein said operating of the electrochemical cell comprises application of a potential difference between the anode and cathode electrodes; transport of H+ ions from the anode to a cathode through an electrolyte and transport of electrons from the anode to the cathode through an external circuit; and reduction of hydrogen ions at the cathode by electrons to thereby produce hydrogen.

* * * * *

UNITED STATES PATENT AND TRADEMARK OFFICE
CERTIFICATE OF CORRECTION

PATENT NO. : 10,519,554 B2
APPLICATION NO. : 15/517738
DATED : December 31, 2019
INVENTOR(S) : Ron Naaman, Claudio Fontanesi and Wilbert Mtangi It is certified that error appears in the above-identified patent and that said Letters Patent is hereby corrected as shown below:

In the Claims

Column 15, Line 34, Claim 1 delete "oxidation of water and transfer to electrons between the" and insert --oxidation of water and transfer of electrons between the--.

Signed and Sealed this
Second Day of February, 2021

Drew Hirshfeld
*Performing the Functions and Duties of the
Under Secretary of Commerce for Intellectual Property and
Director of the United States Patent and Trademark Office*